No. 762,539. PATENTED JUNE 14, 1904.
W. H. & G. W. LEIMAN.
ROTARY PUMP.
APPLICATION FILED FEB. 2, 1904.
NO MODEL.

Witnesses:
J. George Barry,
Henry Thieml

Inventors:
William H. Leiman
George W. Leiman
by attorneys

No. 762,539.

Patented June 14, 1904.

UNITED STATES PATENT OFFICE.

WILLIAM H. LEIMAN, OF NEW YORK, N. Y., AND GEORGE W. LEIMAN, OF NEWARK, NEW JERSEY.

ROTARY PUMP.

SPECIFICATION forming part of Letters Patent No. 762,539, dated June 14, 1904.

Application filed February 2, 1904. Serial No. 191,689. (No model.)

*To all whom it may concern:*

Be it known that we, WILLIAM H. LEIMAN, a resident of the borough of Manhattan, in the city and State of New York, and GEORGE W. LEIMAN, a resident of Newark, in the county of Essex and State of New Jersey, citizens of the United States, have invented a new and useful Rotary Pump, of which the following is a specification.

Our invention relates to a rotary pump, with the object in view of providing a simple, effective, and durable force-pump for general use wherever it is required to employ a column of air as a forcing medium.

A practical embodiment of our invention is represented in the accompanying drawings, in which—

Figure 2:
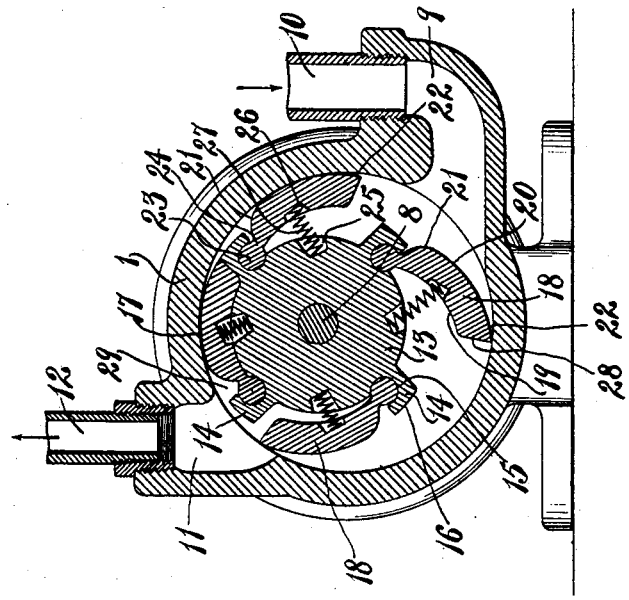
Figure 1:
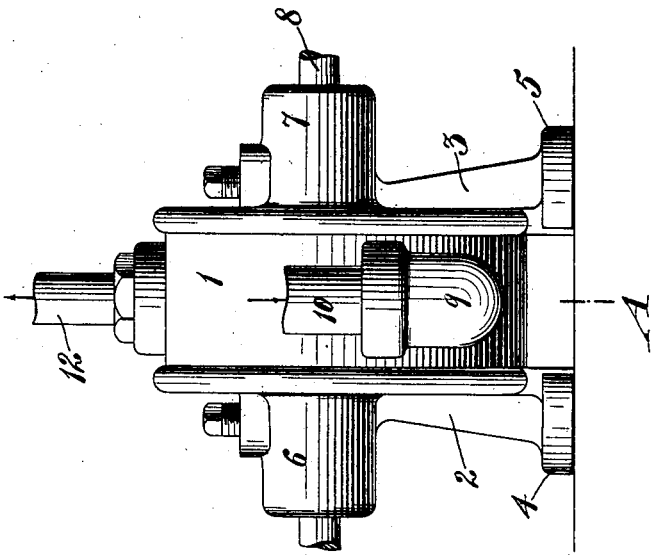

Figure 1 is a view of the pump in side elevation, and Fig. 2 is a central vertical section in the plane of the line A A of Fig. 1.

The casing of the pump is denoted by 1. It is of a general cylindrical form and is supported upon a pair of legs 2 3, terminating in feet 4 5, through which the casing may be bolted to the floor or other suitable support. The opposite ends of the casing 1 are provided with extensions 6 7, within which the shaft 8 of the pump is journaled. The casing 1 is provided at its periphery with an inlet-port 9, with which an inlet-pipe 10 communicates, and with an outlet-port 11, with which a discharge-pipe 12 communicates. We prefer to have the ports 9 and 11 communicate with the interior of the casing 1 at points about diametrically opposite, although their particular position with respect to one another may be varied as circumstances may require. The interior of the casing 1 is cylindrical in form, and the shaft 8 is located eccentrically with respect to such cylindrical interior and carries fixed thereon within the casing 1 a circular disk 13, having a length corresponding to the length of the space between the opposite interior faces of the ends of the casing 1, so as to substantially form a closed joint between the ends of the disk 13 and the opposite interior faces of the ends of the casing, while permitting the disk 13 to rotate therein. The disk 13 is provided at intervals on its periphery with projections 14, in the present instance four in number and located a quadrant's distance apart, the said projections having formed in their corresponding sides rounded sockets 15 for the seating of the vibrating pistons or wings. The outer face 16 of each of the projections 14 is curved to correspond to the curve of the interior of the casing 1, and the distance of such curved face from the axis of the shaft 8 is such that when it reaches a point on a radial line where the interior curved surface of the casing is nearest the axis of the shaft 8 the curved face 16 of the projection will be in close sliding contact with the interior of the casing 1. In the present instance this point is indicated as 17, Fig. 2. The sockets 15 are open in one direction through the side of the projection 14; but the maximum diameter of the socket is greater than the opening through the side of the projection, so that when once the wings or pistons are placed in position with respect to the disk 13 and the latter with its wings placed within the casing 1 the said pistons or wings are held against displacement with respect to the disk 13. The wings or pistons are quite similar to one another and consist of a curved plate 18, the curve 19 on the inner face of the plate corresponding to the curve of the periphery of the disk 13, and the curve 20 on the outer face of the plate corresponding throughout the greater portion of the length of the plate 18 to the curve of the interior of the casing 1, but sharpened or made more abrupt, as shown at 21 22, near the opposite ends of the plate, so that when the central portion of the plate is in contact with the interior of the casing 1 the heel and forward ends of the said plate will recede from the interior of the casing, as clearly indicated at the right hand of Fig. 2. The wings or pistons have at their heel ends cylindrical or rounded portions 23, which fit within the sockets 15 with an easy rocking motion, and intermediate the said cylindrical or rounded portions 23 and the body of the said wings or pistons the said wings or pistons are contracted, as shown at 24, forming a neck to permit the said wings or pistons to rock outwardly away from the disk 13 and back toward the disk 13 into contact with its periphery. Sockets 25 in the periphery of the disk 13 and corresponding sockets 26 in the inner faces 19 of the wings or pistons serve to house and retain the opposite ends of coiled springs 27, the tension of which is exerted to press the wings or pistons away from the disk 13 into contact with the interior of the casing 1 and which also serve to cushion the inner thrust of the said wings or pistons under the action of the interior of the casing 1 as the disk 13, with the wings or pistons thereon, is rotated. The free ends 28 of the pistons or wings are made in planes which are slightly oblique to the radius of the disk 13 and are intended to rest when the wings or pistons are closed on the disk 13 in close contact with the side of the projection 14 opposite that through which the sockets 15 open.

In operation as the disk 13 is rotated by means of the shaft 8 in the direction corresponding to the movement of the hands of a clock the air received through the port 9 between two consecutive wings will be carried forward to the exit 11 and forced out, the operation being repeated with each succeeding wing or piston.

It is important that the joint between the wing and the interior of the casing 1 just beyond the discharge-port 11 shall be air-tight, as the back pressure through the pipe 12 or port 11, particularly when the pump is used to force a column of air against an obstruction in a pipe to remove it from the pipe, may be great, and in order to make this joint effective against leakage we have not only arranged the wing which has passed the port 11 to contact throughout a considerable portion of its extent with the interior of the casing just as it passes the port 11, but have further provided for carrying along between the body of said wing and the projection 14, in which it is hinged in the space 29, a section of the compressed air in the port 11, which when the outer face of the projection 14 comes in close contact with the interior of the casing 1 incloses this compressed air, as in a pocket, making it effective as an elastic packing past which the air from the port 11 must go as well as past the projection 14 and the body of the wing on the opposite side of said section of compressed air in order to escape. This we find to be an exceedingly effective arrangement for keeping the joint tight and making the pump operate in an effective and economical manner. Furthermore, from the time the wing or piston is closed down into contact with the periphery of the disk 13 until it passes the inlet-port its forward edge is held away from the interior of the casing 1, so that it runs easily and without any tendency to scrape; but as soon as it comes into use to force the air in advance of it forward into the discharge-port it has been rocked into a position so that its forward outer edge will closely contact with the interior of the casing 1 and will be held in such position by the outward pressure of the air in advance of it, as well as by the spring, and so will prevent the air from escaping past it until its work in forcing the air forward has been completed. The closing of the wing toward the disk 13 gradually expels the compressed air from the heel toward the free end of the wing, so that there is no compressed-air cushion finally left to prevent the closing of the wing onto the disk 13, excepting such as may be contained within the spring-sockets, and this will serve a useful cushioning effect rather than become a disadvantage. It is also to be observed that the section of compressed air carried forward as a packing between the body of the wing and the projection to which it is hinged will be caught by the next succeeding wing and carried forward as a part of the charge of air to be forced into the discharge-pipe 12.

It is obvious that the pump here shown and described might be used as a simple air or water circulating pump instead of a force-pump without any change whatever in its construction, and we have further found that it serves well the purpose of a rotary engine by reversing the order and admitting the steam or other motive fluid through the present discharge-pipe 12 and discharging the steam or other motive fluid through the present inlet-port 10.

What we claim is—

1. The combination with a cylindrical chamber having inlet and outlet ports and a disk mounted eccentrically within the chamber and having its periphery spaced from the interior of said chamber, the said disk being provided on its periphery with projections extended outwardly therefrom into position to form a closed joint with the interior of the chamber in proximity to the outlet-port, of swinging wings or pistons hinged in the corresponding faces of the said projections to swing toward and away from the periphery of the disk, the outer faces of said wings or pistons being so curved as to form an extended contact with the interior of the cylinder for a considerable distance after passing the outlet-port whereby a closed pocket is formed between the projection on the disk and the outer face of the swinging wing or piston immediately after the projection on the disk passes the outlet-port thereby preventing the escape of fluid between the said wings and interior of the cylinder.

2. The combination with a cylindrical chamber having inlet and outlet ports and a disk mounted eccentrically within the said chamber and having its periphery spaced from the interior of said chamber, the said disk being provided on its periphery with projections extending outward therefrom into position to form a closed joint with the interior of the chamber in proximity to the outlet-port, of swinging wings or pistons hinged in the corresponding faces of the said projections to swing toward and away from the periphery of the disk, the outer faces of said wings or pistons being so curved that the free ends of the pistons will be spaced from the interior wall of the cylinder throughout the greater portion of the distance between the outlet and inlet ports while the outer faces of said wings or pistons will remain out of contact with the interior of the cylinder and their free ends in contact with the interior of the cylinder throughout the space from the inlet-port to the outlet-port.

In testimony that we claim the foregoing as our invention we have signed our names, in presence of two witnesses, this 30th day of January, 1904.

WILLIAM H. LEIMAN.
GEORGE W. LEIMAN.

Witnesses:
FREDK. HAYNES,
C. S. SUNDGREN.